United States Patent
Leonard et al.

[11] Patent Number: 6,137,566
[45] Date of Patent: Oct. 24, 2000

[54] METHOD AND APPARATUS FOR SIGNAL PROCESSING IN A LASER RADAR RECEIVER

[75] Inventors: Donald Leonard, Cupertino; Thomas Driscoll, Sunnyvale; Harold Sweeney, Menlo Park; Jay Bolstad, Sunnyvale; David Schultz, Mt. View, all of Calif.

[73] Assignee: EOO, Inc., Sunnyvale, Calif.

[21] Appl. No.: 09/256,942

[22] Filed: Feb. 24, 1999

[51] Int. Cl.[7] .............................. G01B 11/26; G01C 3/08; G01C 21/24; H01L 27/00
[52] U.S. Cl. ..................................... 356/141.1; 250/208.1; 250/214 DC; 250/206.2; 250/559.37; 701/152; 356/5.01
[58] Field of Search ..................................... 348/301, 311, 348/315; 250/206.1, 206.2, 559.37, 208.1, 214 DC; 356/141.2, 141.5, 5.01; 702/151, 152

[56] References Cited

U.S. PATENT DOCUMENTS

| | | | |
|---|---|---|---|
| 3,591,292 | 7/1971 | Feuchter et al. | 356/141.5 |
| 3,657,547 | 4/1972 | Mansfield | 356/141.1 |
| 3,719,424 | 3/1973 | Weischedel | 356/141.5 |
| 3,954,340 | 5/1976 | Blomquist et al. | 356/141.1 |
| 5,134,686 | 7/1992 | Jutamulia et al. | 395/25 |
| 5,162,643 | 11/1992 | Currie | 250/206.1 |
| 5,446,529 | 8/1995 | Stettner et al. | 356/4.01 |
| 5,796,094 | 8/1998 | Schofield et al. | 250/208.1 |

*Primary Examiner*—Stephen C. Buczinski
*Attorney, Agent, or Firm*—Lumen Intellectual Property Services

[57] ABSTRACT

An apparatus for receiving signals from a photodetector in a photodetector array. The apparatus has a number of comparators (e.g. 5) connected to the photodetector. each photodetector in the array has a similar circuit connected. Each comparator compares the output of the photodetector with an adjustable threshold level. Each threshold level is controlled by a threshold controller. Each threshold level corresponds with a light intensity value. Outputs of the comparators are each connected to a shift register. Each shift register is triggered to sample the output of its associated comparator at a certain speed (e.g. 800 Mhz). In operation, the shift registers each store a bit sequence representative of the comparator output. The data acquired is used to adjust the threshold levels applied to the comparators. In this way, adjustable intensity resolution is provided at desired ranges of intensity. The present invention includes a method for combining data from multiple laser pulses and fitting the data to a best fit statistical distribution so that an intensity value is obtained for each voxel in a 3-D laser radar image. Also, the present invention includes embodiments where different photodetectors in the array have different set threshold levels.

28 Claims, 10 Drawing Sheets

Threshold Level vs. Location in Array

METHOD AND APPARATUS FOR SIGNAL PROCESSING IN A LASER RADAR RECEIVER

This invention was supported in part by contract number N66001-93-C-6006 from the Department of Defense (DOD). The Government has certain rights in the invention.

FIELD OF THE INVENTION

This invention relates generally to 3-D imaging laser radar and laser rangefinders. More specifically, the present invention relates to a method and apparatus for processing electronic signals in a laser radar device.

BACKGROUND OF THE INVENTION

Laser radar devices are useful in underwater imaging and in the identification of high speed moving objects such as missiles or airplanes. Laser radar has the capability to produce 3-dimensional images of objects and to measure with high precision the range and angular location of an object.

FIG. 1 shows a schematic of a laser radar device for creating an image of an object 5. The laser radar device has a pulsed laser 1, a photodetector array 6 with imaging lens assembly 2, a signal processor 3, and a computer 4. The laser 1 is synchronized with the signal processor and computer. In operation, the laser 1 produces a short duration (e.g. less than 5 ns) light pulse 7 directed at the object 5. Backscattered light from the object is imaged upon the photodetector array 6. The image on the array provides 2-dimensional (angle-angle) information about the object in the plane of the photodetector array 6. The arrival time of photons at the array provides depth and range information about the object (i.e. information in the third dimension, perpendicular to the plane of the photodetector array 6). Typically, the arrival time of the photons is divided into a number of time bins corresponding to different ranges. Therefore, the laser radar device provides three dimensional information about the object. In the prior art laser radar system of FIG. 1, backscattered light from a single light pulse 7 is imaged upon the entire array 6. Thus there is no need for a mechanical two-dimensional scanner as needed for other prior art laser radar systems. The 3-dimensional information from all photodetector or pixels in the array is output to the computer which calculates an image. The computer may also calculate certain structural or optical characteristics of the object. Also, the computer may identify the object based on its three dimensional shape.

For accurate range information, it is essential that the laser and signal processor be accurately synchronized so that the time-of-flight of the photons is accurately measured (i.e. within several nanoseconds). Also, it is important for the photodetector array to have a fast response time. Arrays such as PIN diode arrays or multi-anode photomultiplier tubes can be used, for example. Each photodetector in array 40 simultaneously receives light from region 43, and each photodetector has its own circuit 20.

In laser radar applications such as object identification and imaging, it is important to acquire intensity information as a function of voxel (volume element) in the 3-dimensional image. In other words, each voxel must have an associated intensity measurement.

Some imaging radar systems only measure range to a first target surface for each pixel. More information is available for imaging if each pixel provides information over a distribution of range values.

One conventional approach to measuring optical intensity in each voxel is to connect each pixel in the photodetector array 6 with a high speed analog to digital converter. Each A-D converter provides a digital representation of the intensity in each voxel. A disadvantage with this approach is that one A-D converter is required for each pixel. This increases the size, weight and cost of the device. For precision ranging, very high speed A-D converters are required, performing a measurement every few nanoseconds. Finally, a high data transfer rate to the computer is required. Another problem with this approach is that, for high intensity resolution and high dynamic range intensity measurement, the A/D converter must approximate too many bits of precision. It is difficult to provide many bits of precision for each photodetector in the short time scales necessary.

The conventional approach to signal conversion is to use a sample/hold circuit in conjunction with an A/D converter. The signal from a photodetector must be constant for an 'aperture time' while the A/D conversion is performed. The analog signal may change during the aperture time, leading to errors in the digital representation produced. Sample/hold A/D converters have relatively long aperture times compared to aperture times preferred for high resolution laser radar imaging.

Another approach to measuring voxel intensities is to use a number of CCD arrays, with each array gated with an associated micro-channel plate image itensifier tube. The CCD arrays are turned on at slightly different times, therefore providing range information. A problem with this approach is that it requires complex signal processing to integrate the signals from the different CCD arrays. Also, multiple imaging arrays and intensifier tubes increase the weight and cost of the device.

U.S. Pat. No. 5,446,529 to Stettner et al. discloses a method for obtaining intensity information for each voxel in a 3-D laser radar image. Stettner employs an array of charge storage capacitors for each pixel in the photodetector array. The capacitors are sequentially connected to their associated pixel during data acquisition so that a single capacitor is associated with each voxel in the scene being imaged. MOSFET switches are used to connect the capacitors with the pixels. Each capacitor stores a charge related to the light intensity from a voxel. The charges on each capacitor are then converted into a digital representation which is processed by a computer. The approach of Stettner et al. necessarily has a 'dead time' while switching capacitors. The dead time limits the time resolution, and therefore the range resolution.

Another problem with laser radar generally is that the backscattered light may have a wide range of intensities spanning several orders of magnitude. Each pixel in the photodetector array may receive only a single photon, or many thousands of photons. Straightforward processing of the photodetector signals requires a receiver (i.e. an A-D converter) with a large dynamic range. A large dynamic range receiver is either expensive, or provides limited resolution at very high or very low light intensities.

OBJECTS AND ADVANTAGES OF THE INVENTION

Accordingly, it is a primary object of the present invention to provide a method and apparatus for signal processing in a laser radar that:

1) provides an accurate digital representation of light intensity from each voxel;
2) is capable of producing digital representations for a wide range of light intensities;

3) is relatively inexpensive, small, and light weight;
4) requires only a single photodetector array;
5) is fast and therefore provides high range (depth) resolution;
6) does not have 'dead time' between intensity measurements at different ranges.

These and other objects and advantages will be apparent upon reading the following description and accompanying drawings.

SUMMARY OF THE INVENTION

These objects and advantages are attained by an apparatus for processing signals received from a photodetector in a laser radar device. The apparatus has a number (e.g. 5–10) of comparators associated with the photodetector. Each comparator has two comparative inputs (i.e. inverting and noninverting inputs), and an output. One of the comparative inputs from each comparator is connected to an output of the photodetector. A shift register is connected to the output of each comparator. A threshold controller controls a threshold level at one of the comparative inputs on each of the comparators. The threshold controller can independently adjust a threshold level at each comparative input. The threshold controller therefore determines the signal level from the photodetector necessary to switch the comparator. A low pass filter may be connected between the photodetector and comparators. Also, an amplifier may be connected between the photodetector and comparators. The threshold controller may include a digital to analog converter so that the threshold levels are controllable by digital input signals to the threshold controller.

Preferably, the shift registers and comparators are emitter-coupled logic (ECL) components.

Also preferably, the comparators and shift registers are connected to produce gray code output. In this embodiment, the number of shift registers can be less than the number of comparators.

The present invention also includes a method for laser radar imaging using the apparatus of the present invention. In the present method, a light pulse is directed at a scene made of voxels (volume elements) to be imaged. The light pulse has a duration less than 5 nanoseconds. Backscattered light from the scene is detected with a photodetector array having a time response less than 5 nanoseconds. Then, the output of each photodetector in the array is compared to a number of threshold levels. Next, a bit sequence is generated for each threshold level. Each bit sequence indicates when the photodetector signal exceeded the associated threshold level. Each bit sequence is associated with a threshold level.

The method can further include the step of changing the threshold levels based on the bit sequences. For example, threshold levels are raised or reduced if the threshold levels are always or never exceeded, respectively. Also, threshold levels may be different or the same for each photodetector in the array.

Preferably, the method further includes the steps of generating a 3-D image according to the present method. First, several light pulses are fired. For each laser pulse a set of bit sequences are stored in the shift registers. Bits from the bit sequences are grouped according to voxel in the scene (both timing and angular (i.e. which photodetector) information is used to perform this grouping). For each voxel, a plot of number of high bits vs. threshold is produced. Then, for each voxel, a best fit statistical distribution is fit to the high bits vs. threshold plot. Each voxel has an associated best fit statistical distribution. Then, the best fit statistical distribution for each voxel is used to calculate a mean intensity value for each voxel. Once an intensity value for each voxel is known, the 3-D image is complete. Preferably, the statistical distributions are Poisson distributions or negative binomial distributions.

DETAILED DESCRIPTION

The present invention provides a laser radar method and apparatus for producing a 3-dimensional image of a scene. The present invention is particularly useful in cases where backscattered light intensity is relatively low. More specifically, the present invention is particularly useful where backscattered light intensity cannot be accurately determined with a single measurement due the fact that random photon fluctuations are comparable to the intensity of the backscattered light. Such conditions exist, for example, where the amount of backscattered light has an intensity less than about 500 photons per photodetector per laser pulse. The present invention works for very low light levels even in the low limit of less than 1 photon per laser pulse per voxel.

Figure 1:
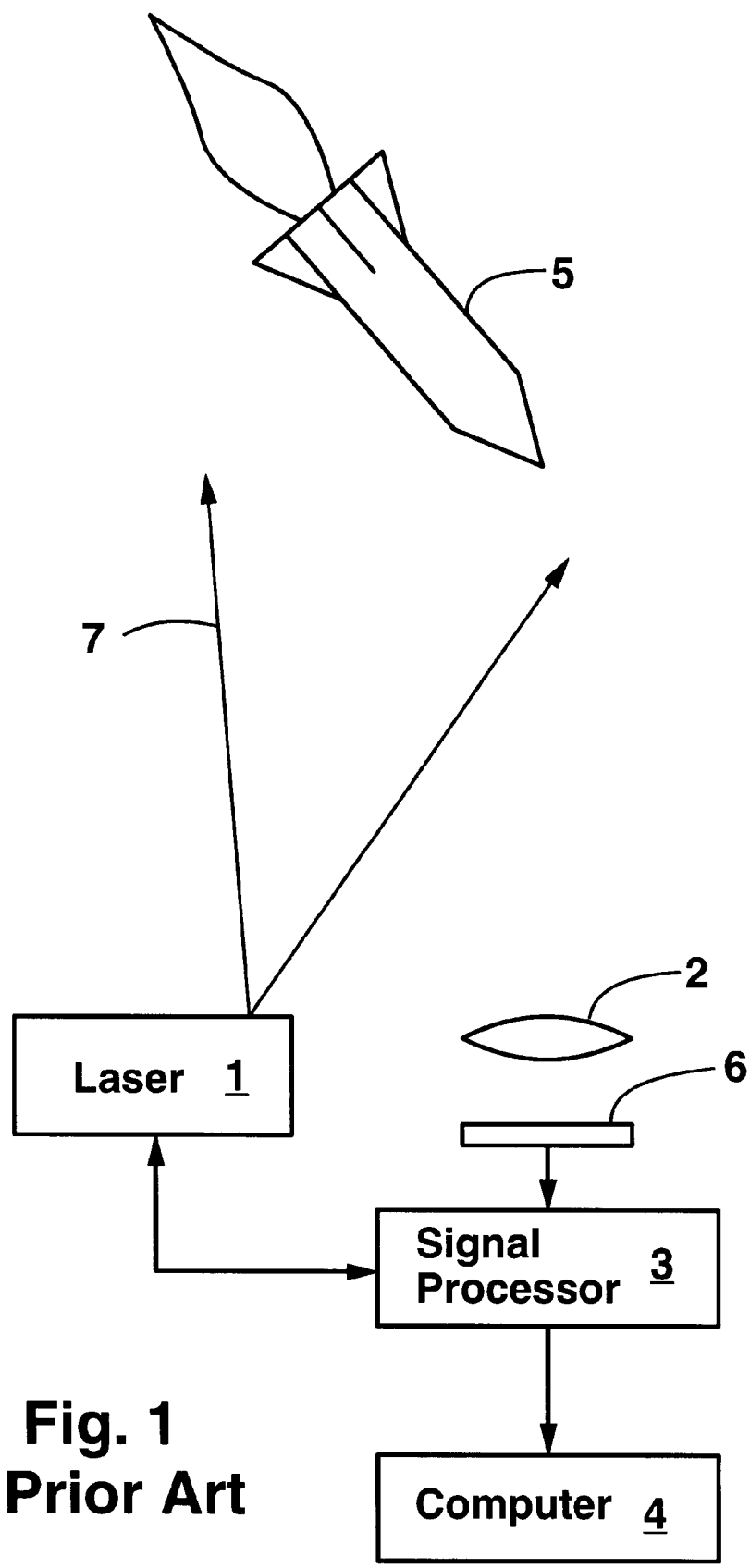
FIG. 1 (Prior Art) shows a generic laser radar system according to the prior art.
Figure 2:
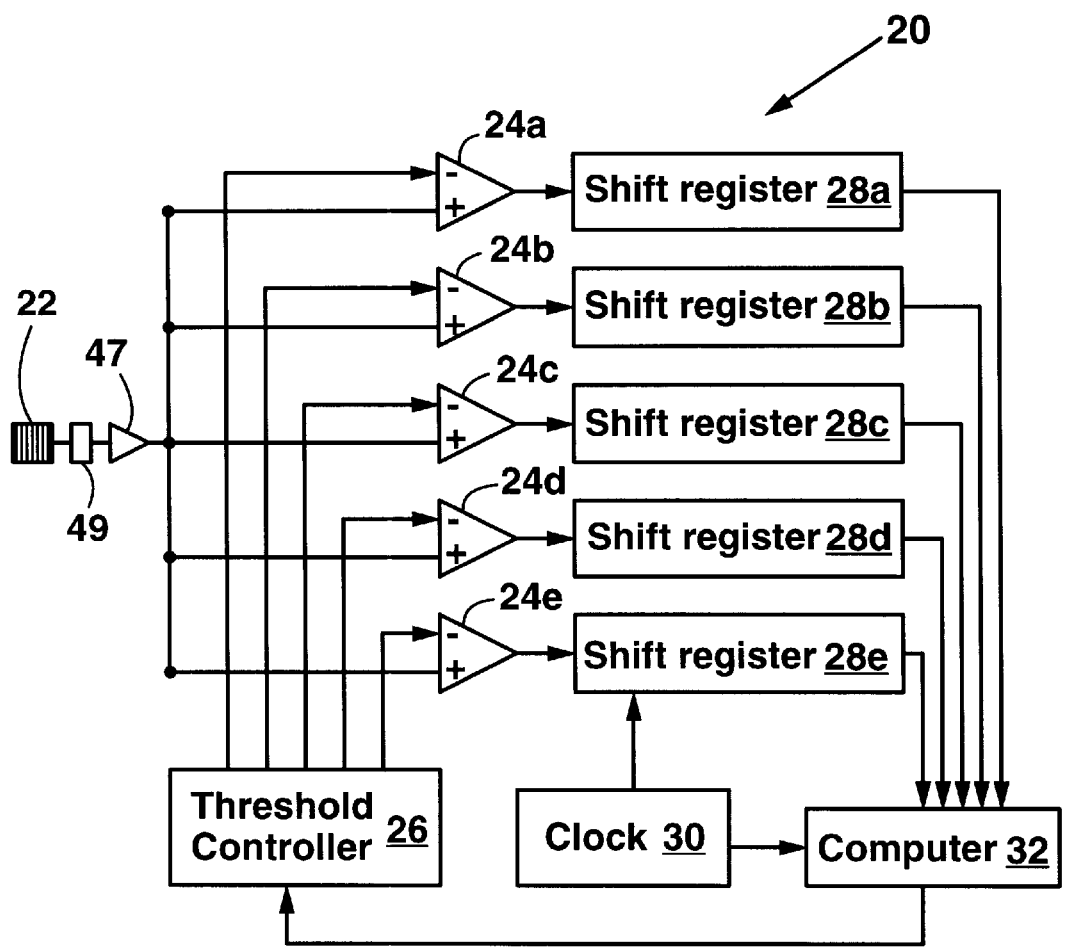
FIG. 2 shows a circuit according to the present invention for processing signals from a single photodetector.

FIG. 2 shows a signal processing circuit 20 according to the present invention. The circuit 20 is connected to a single photodetector 22 of a photodetector array. Only a single photodetector and circuit is shown for simplicity. A typical photodetector array may have dozens or hundreds of photodetectors, in which case one signal processing circuit 20 is provided for each photodetector in the array.

The photodetector 22 may be a PIN diode, or an anode from a multi-anode photomultiplier tube (for example a Hamamatsu R4110U microchannel plate photomultiplier tube with a 10×10 array of independent anodes). Preferably, the detector is capable of resolving photon events to within 5 nanoseconds. Also preferably, the photodetector can detect a single photon. Also preferably, the photodetectors has a quantum efficiency in the range of about 10–40%. Suitable photodetectors for laser radar are well known in the art.

Circuit 20 includes 5 comparators 24a, 24b, 24c, 24d, 24e with inverting and noninverting inputs (labeled with '−' and '+' signs). An output of the photodetector is connected to all the inverting inputs of the comparators 24. The noninverting inputs are connected to a threshold controller 26. The threshold controller 26 provides a different voltage at each of the noninverting inputs of the comparators 24a–24e. The threshold controller is capable of changing the voltage present at the comparator noninverting inputs. The voltages present at the noninverting inputs are hereinafter referred to as 'threshold levels'. For the present discussion, comparator 24a has the highest threshold level, comparator 24e has the lowest threshold level, and comparators 24b, 24c, and 24d have intermediate threshold levels. A method for selection of the threshold levels is discussed below.

The inverting and noninverting inputs are generically considered to be comparative inputs. It is not necessary to connect the threshold controller to the noninverting inputs, and the photodetector to the inverting inputs. Optionally, the photodetector is connected to the noninverting inputs, and the threshold controller is connected to the inverting inputs.

Circuit 20 also includes 5 shift registers 28a–28e connected to the outputs of the comparators 24a–24e. The shift registers are capable of storing sequences of digital bits produced by the comparators 24a–24e. In one embodiment, the shift registers each store 40 digital bits. The shift registers may have a capacity for storing 10–100 bits, for example. The capacity of the shift registers is practically limited by the size, weight and power of data storage (if desired, the shift registers can store many thousands of bits). A clock 30 controls the frequency of operation of the shift registers. All the shift registers 28a–28e operate at the same frequency. A computer 32 is connected to the output of the shift registers 28a–28e. The computer 32 is capable of receiving and processing digital bits from the shift registers 28a–28e.

Preferably, the shift registers and comparators are made with high speed electronic components. In a particularly preferred embodiment, the shift registers and comparators are made with emitter-coupled logic (ECL) components because ECL components have superior high speed performance. The shift registers and comparators can also be made with CMOS electronic components. Other families of electronic components can be used provided they have exceptional high speed performance. Electronics with nanosecond or subnanosecond switching times is preferred.

The computer 32 is also in communication with the threshold controller 26. By communicating with the threshold controller, the computer 32 is capable of individually controlling the threshold levels (i.e. voltages at each of the noninverting inputs) at each of the comparators 24a–24e. The threshold controller 26 may have a digital to analog converter for each comparator 24a–24e. The threshold controller 26 receives digital instructions from the computer 32 and provides corresponding threshold levels to the noninverting inputs.

Preferably, one threshold controller 26, one clock 30 and one computer 32 is provided for an entire photodetector array. In this embodiment, all the photodetectors in the array have the same threshold levels. It is understood that photodetector 22 is a single photodetector (i.e. a single pixel) in a photodetector array. In a laser radar device including the circuit of FIG. 2, each photodetector in an array is connected with 5 comparators and 5 shift registers. For example, a signal processing circuit according to the present invention for a 100-pixel photodetector array will have a total of 500 comparators and 500 shift registers, if 5 threshold levels are provided for each photodetector.

Although FIG. 2 shows the present invention as having 5 comparators and 5 shift registers, the present invention can have a larger number or smaller number of comparators and shift registers. It is particularly preferred in the present invention to have 5–10 comparators for each photodetector. The optimal number of comparators and shift registers is influenced by size, weight and power constraints. Reduction in accuracy caused by fewer comparators can be offset by averaging data over a larger number of laser pulses.

Optionally, an amplifier 47 is connected between the detector 22 and the comparators. The amplifier 47 is necessary in cases where the detector does not provide enough output to drive the comparators 24a–24e. This may be a particular concern in devices having a relatively large number of comparators (i.e. more than 5 comparators).

Also optionally, a low pass filter 49 may be provided for the detector 22 output. An optimal cut-off frequency for the lowpass filter 49 is determined by the high frequency capabilities of the shift registers 28a–28e and comparators 24a–24e.

Figure 3:
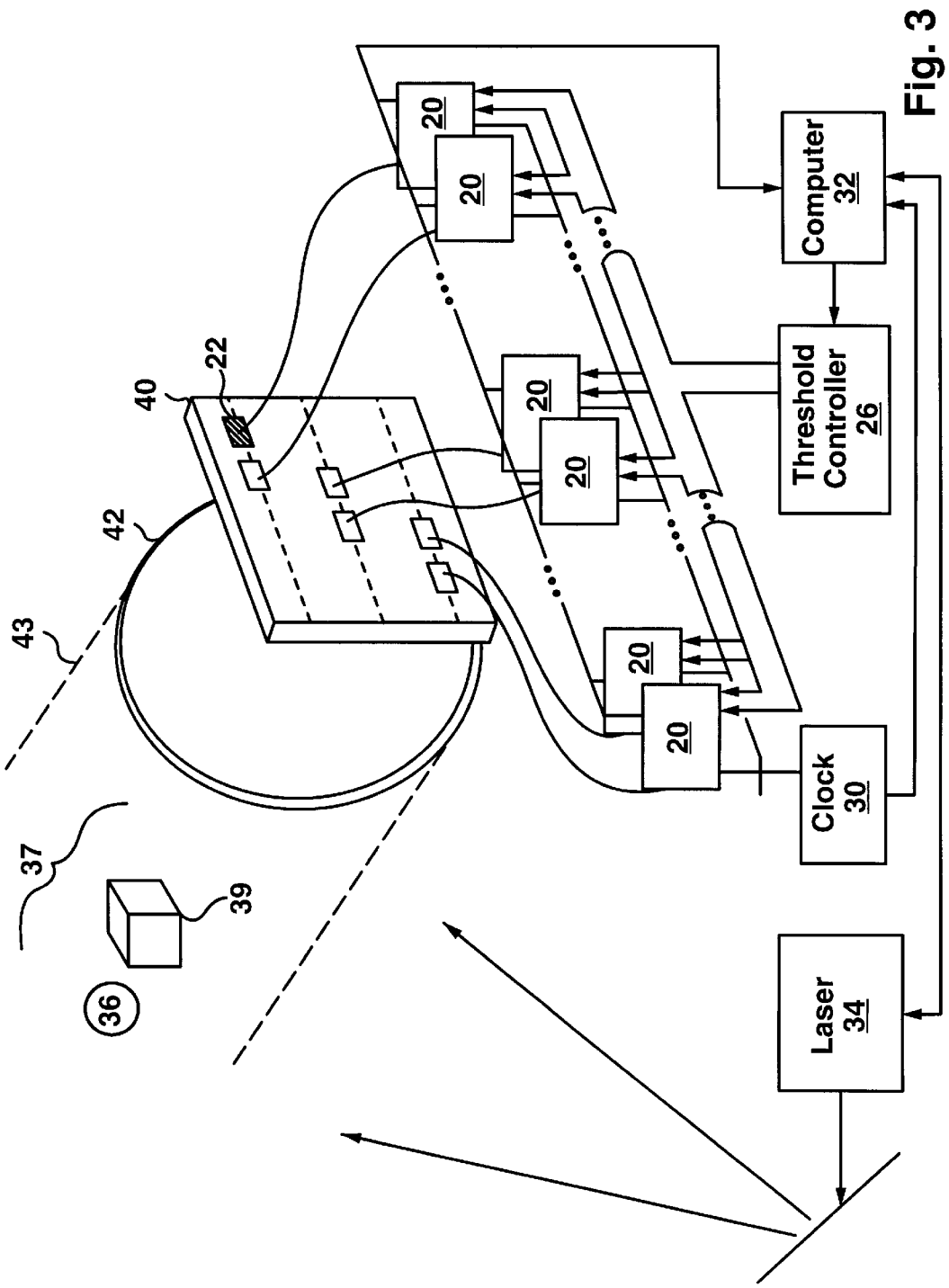
FIG. 3 shows a laser radar system according to the present invention.

FIG. 3 shows a laser radar system which includes the circuit 20 of FIG. 2. The laser radar system has a pulsed laser 34 which is directed toward an object 36 to be imaged. The pulsed laser may be a frequency doubled YAG laser which produces pulses of less than 2 nanoseconds in duration. The photodetector 22 is a single detector (shaded black) in a photodetector array 40 having many photodetectors. The photodetector array is located at the image plane of an imaging lens assembly 42. Therefore, detector 22 only receives light traveling toward lens within a predetermined region 43 extending from the lens assembly 42.

In operation, the pulsed laser 34 directs a pulse of laser light to illuminate the object 36 within scene 37. Scene 37 is comprised of voxels 39 (volume elements). The laser light pulse is synchronized with the clock 30 and computer 32. After the laser light pulse, the clock and computer may delay data acquisition for a predetermined duration (e.g. a duration based on the round trip light travel time from the laser 34 to the object 36 to the detector 22). Alternatively, data acquisition can start at the same time as the laser pulse.

Methods for appropriately timing data acquisition in a laser radar device are known in the art.

The object 36 backscatters laser light which is then imaged upon the array 4 0. The amount of light incident upon the detector 22 varies with time. The voltage output of the detector is proportional to the light intensity striking the detector 22. The output of the detector is applied to the noninverting inputs of the comparators 24a–24e.

Each comparator 24a–24e provides a high output if the light intensity on detector 22 exceeds a certain value. Comparator 24e provides a high output for a relatively low light intensity. Comparator 24a provides a high output for a relatively high light intensity. The output of any comparator 24a–24e will be high for the duration that the detector output exceeds the corresponding threshold level. The number of comparators providing high output at any instant is therefore a measure of the detector 22 output. If the detector output exceeds the threshold level of comparator 24a, then all the comparators 24a–24e provide high output. If the detector output is lower than the threshold level of comparator 24e, then all the comparators 24a–24e provide low output.

As laser light photons scattered from the object 36 arrive at the detector 22, the clock 30 controls the shift registers 28a–28e in acquiring and storing digital bits from the comparators 24a–24e. The shift registers 28a–28e each acquire and store one digital bit with each clock cycle. Each shift register stores a bit sequence having a predetermined number of bits. The length of the bit sequence is determined by the storage capacity of the shift registers (e.g. 40 bits). For each laser pulse, each shift register acquires and stores one full bit sequence. After each laser pulse, each shift register outputs its bit sequence to the computer, where the bit sequences are stored and processed. The bits from the shift registers are output to the computer at a relatively slow speed. Then, before the next laser pulse, the shift registers are reset to acquire the next bit sequence.

The frequency of bit acquisition by the shift registers 28a–28e determines a maximum resolvable frequency in the detector output according to the well known Nyquist sampling theorem. Accordingly, the low pass filter 49 preferably has a cutoff frequency which is less than ½ the frequency of the shift register sampling rate (e.g. lowpass cutoff of less than 400 Mhz for sampling rate of 800 Mhz).

The sampling rate of the shift registers determines a length of the voxels 39 in a direction extending from the lens assembly 42. For example, a sampling rate of 800 Mhz corresponds to 1.25 nanoseconds between bit acquisitions, and a longitudinal voxel dimension of about 19 cm (in air).

The bit sequences stored in the shift registers 28a–28e provide a digital representation of the detector 22 output vs. time.

Figure 4:
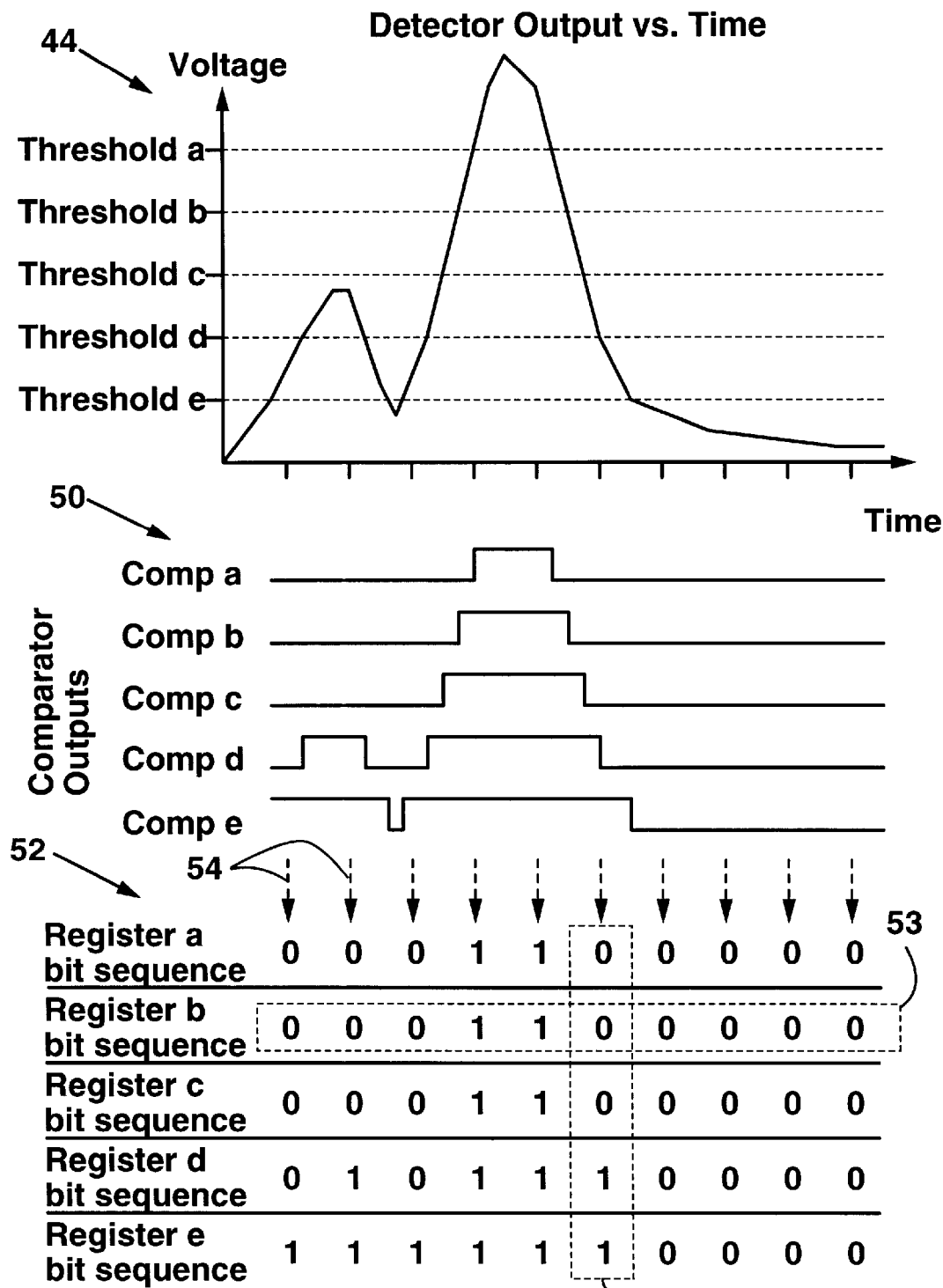
FIG. 4 shows a set of timing diagrams illustrating how the circuit of FIG. 2 operates.

FIG. 4 shows timing diagrams illustrating the operation of the circuit 20. Graph 44 shows a plot of detector 22 output voltage vs. time for a single laser pulse. The time scale is on the order of nanoseconds. Also shown in the graph are the threshold levels (thresholds a–e) applied to comparators 24a–24e. Comparator outputs corresponding to the graph 44 are shown at 50. Bit sequences stored in the shift registers 28a–28e are shown in chart 52. Arrows 54 indicate times at which shift registers 28a–28e acquire bits from comparators 24a–24e. Each horizontal row (for example row 53) in chart 52 is a bit sequence. Each column (for example column 56) in chart 52 corresponds to an individual volume element (voxel). Each column in chart 52 therefore provides a measure of the intensity of backscattered light from a voxel.

Chart 52 represents all the bit sequences acquired for a single photodetector and single laser pulse. In a photodetector array, each photodetector will produce a chart similar to chart 52 for each laser pulse.

For many laser radar applications, the columns in chart 52 do not provide adequate intensity resolution due to very low backscattered light intensity and background noise (e.g. sunlight). Low light intensity causes the intensity of measured light to deviate in a statistical manner from the true intensity value. In other words, the intensity of light detected is a statistical distribution around a mean value. Therefore, it is often necessary to fire multiple laser pulses and acquire multiple bit sequences to achieve a desired intensity resolution. When multiple laser pulses are used, random, statistical variations in light intensity are averaged out. The present invention includes methods for combining data acquired during multiple laser pulses.

After multiple laser pulses, multiple charts analogous to chart 52 are produced for each photodetector. In the method of the present invention, bits corresponding to a voxel (i.e. corresponding columns from the multiple charts) are grouped together.

Figure 5A:
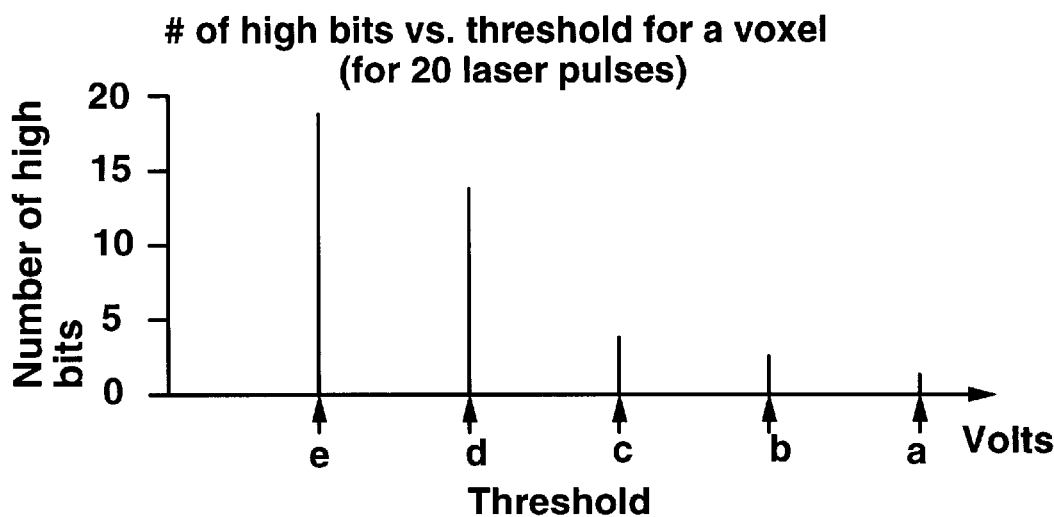
FIG. 5A shows a high bits distribution plot according to a preferred method of the present invention.

Then, for each voxel, a number of high bits vs. threshold plot is produced (a 'high' bit indicates the corresponding threshold was exceeded. A 'high' bit does not necessarily have a high voltage.). FIG. 5A shows an exemplary number of high bits vs. threshold plot (hereinafter referred to as a "bits vs. threshold plot") for 20 laser pulses. Of course, in this example, the maximum number of high bits for each threshold is 20. It is understood that a bits vs. threshold plot is produced for each voxel. Of course, the bits vs. threshold plot does not in fact need to be a graphical plot; it can be stored in the computer as a matrix or any other data format.

It is important to note that, although the horizontal scale in FIG. 5A is measured in units of volts, any equivalent measure can be used. For example, thresholds can be expressed in units of number of photons, number of photoelectrons or similar units if the characteristics of the photodetector are understood. The relationship between light intensity (i.e. number of photons or photoelectrons) and photodetector voltage output can be determined empirically if necessary.

Figure 5B:
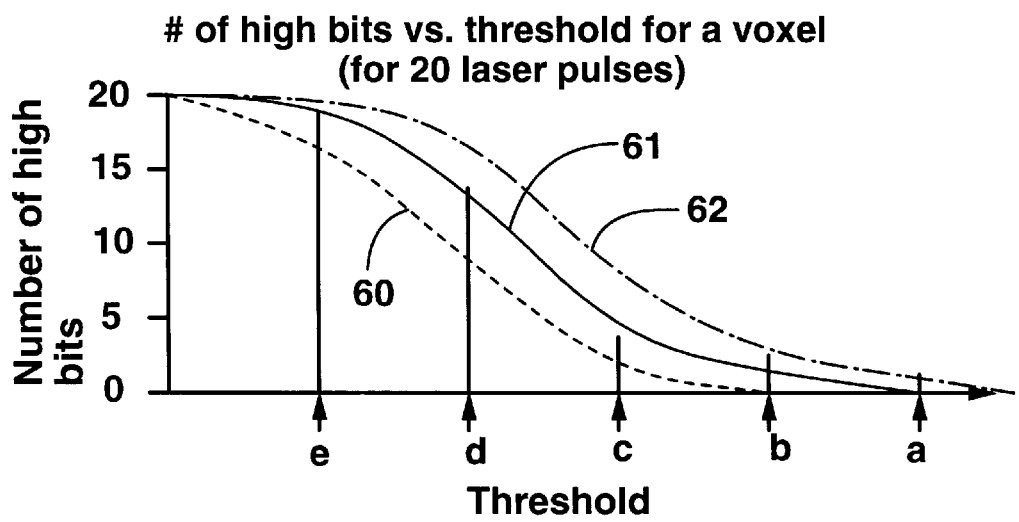
FIG. 5B shows a best fit statistical distribution fit to the plot of FIG. 5A.

Next, in FIG. 5B the bits vs. threshold plot of FIG. 5A is matched to a best fit statistical distribution. FIG. 5B shows three Poisson distributions 60, 61, 62 for three different mean light intensities. In this specific example, the three Poisson distributions correspond to mean light intensities of 8, 10, and 12 photoelectrons. Distribution 60 for 8 photoelectrons is too low to match the plot of FIG. 5A; distribution 62 for 12 photoelectrons is too high to match the data of FIG. 5A. Poisson distribution 61 is the best fit statistical distribution for the data of FIG. 5A. Since distribution 61 is the best fit, it is inferred that the mean intensity from the voxel for the 20 laser pulses is 10 photoelectrons. From the known characteristics of the photodetector used (e.g. photomultiplier), an 'intensity' value of 10 photoelectrons can be correlated to a number of photons or any other desired unit of light intensity measurement.

The functions of producing the bits vs. threshold plots and matching the plots with a best fit statistical distribution for each voxel are performed by the computer 32.

Statistical light intensity distributions for mean light intensities are well known in the art. Poisson distributions as well as negative binomial distributions can be used to find the best fit statistical distribution in the method of the present invention. The choice between Poisson distributions and negative binomial distributions can be made based on known environmental conditions, or can be made empirically. For more information on Poisson and negative binomial light intensity distributions, and when they apply to different light scattering environments, reference can be made to "Some effects of Target-Induced Scintillation on Optical Radar Performance", J. Goodman, *Proceedings of the IEEE*, Vol. 53, no. 11, November 1965.

The important point here is that the best fit statistical distribution is used to determine the mean light intensity for the voxel. When a mean light intensity value is provided for each voxel, a 3-dimensional image of the scene 37 is complete. In the present invention, it is strongly preferred to use multiple laser pulses so that statistical analysis according to the present method can be performed.

The number of laser pulses necessary to provide a 3-dimensional image depends upon the desired intensity resolution. A more accurate determination of light intensity for each voxel requires a larger number of laser pulses. Also, low light intensities require a larger number of laser pulses. Typically, adequate intensity resolution for object identification (i.e. airplanes, missiles) is provided by about 10–50 laser pulses when each photodetector provides 1–100 photoelectrons per pulse. Generally, it is observed in experiments by the present inventors that at least 5–7 laser pulses are needed even when each photodetector produces over 100 photoelectrons per laser pulse.

Intensity resolution can also be improved by providing an increased number of comparators 24a–24e (i.e. an increased number of threshold levels). Increasing the number of comparators 24a–24e reduces the number of laser pulses required to achieve a certain intensity resolution. However, intensity resolution is provided with decreasing returns above more than about 7–10 threshold levels. For example, with 7 threshold levels, the required number of laser pulses is reduced by about 10% compared to 5 threshold levels.

Figure 6A:
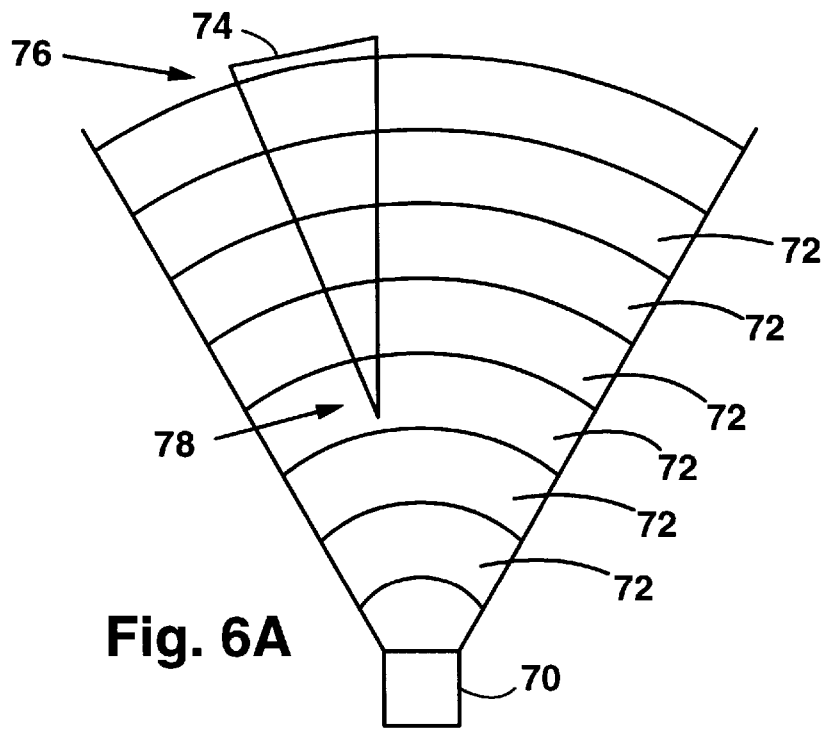
FIG. 6A shows a laser radar device with only a single photodetector.

It is noted that the above method for fitting each voxel intensity with a best fit distribution is applicable to laser radar devices having only a single photodetector. A laser radar device with only a single photodetector does not provide angle information, only range information. Therefore, such a laser radar divides the scene into sheets of equal distance from the detector. FIG. 6A shows a laser radar device with only a single photodetector 70. When the signal from the photodetector 70 is processed according to the methods of the present invention, each voxel in the scene is a concentric 'shell' 72. The backscattered light intensity value for each shell-shaped voxel 72 is provided. Although angular information is not provided when only a single photodetector is used, structural features of an object can still be determined from the timing and intensity of backscattered light.

Figure 6B:
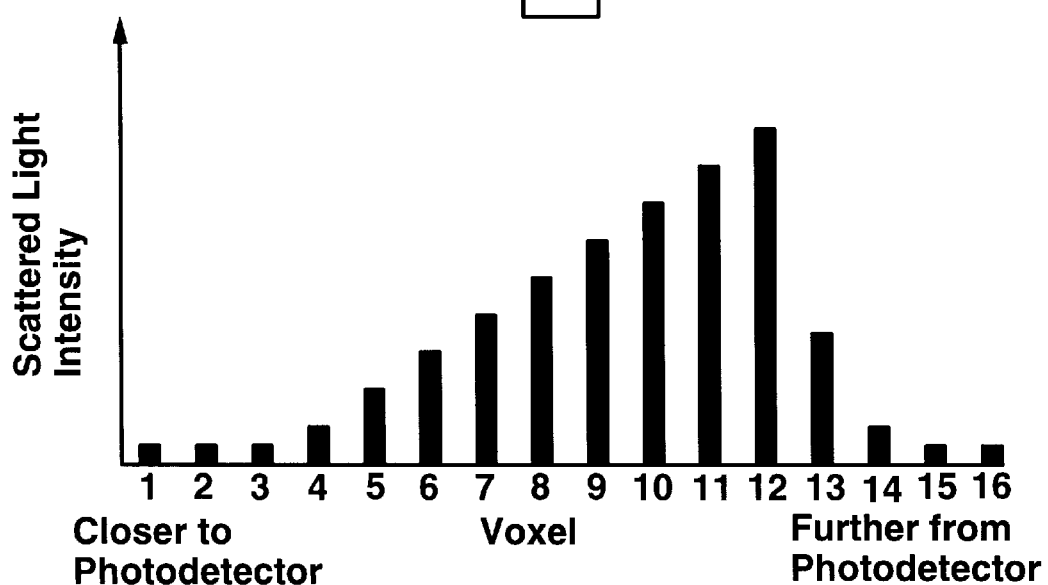
FIG. 6B shows a plot of light intensity vs. voxel for a cone-shaped object imaged by the device of FIG. 6A.

FIG. 6B shows scattered light intensity vs. voxel for a cone-shaped object 74 shown in FIG. 6A. The plot clearly illustrates that the cone 74 scatters more light near its base 76 than near its tip 78. A plot of light scattering intensity vs. range can be used to infer certain facts about the shape of an object.

Figure 7A:
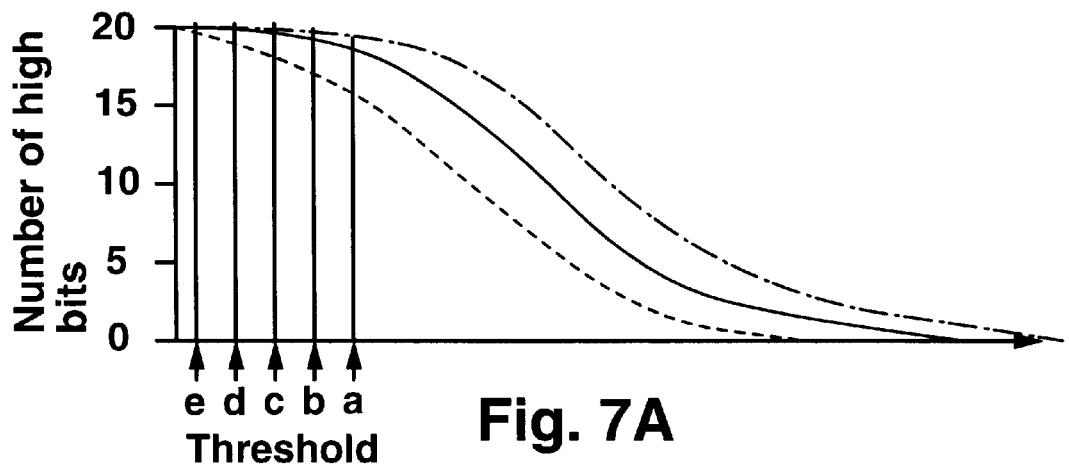
FIGS. 7A and 7B show examples of improperly set threshold levels.
Figure 7B:
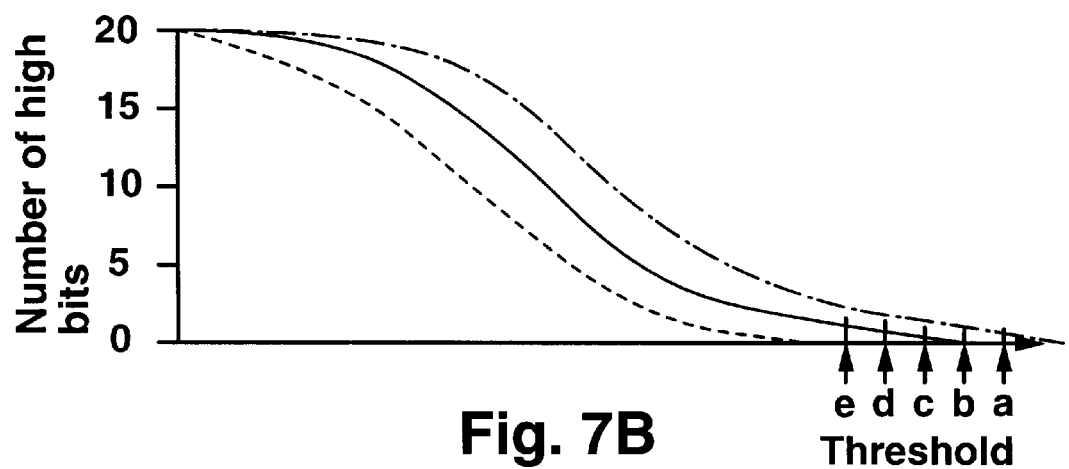

Proper adjustment of the threshold levels is very important for accurately matching the bits vs. threshold plot with a best fit statistical distribution. FIGS. 7A and 7B show bits vs. threshold plots for cases where the threshold levels were not appropriately set. It is not possible to accurately determine the mean intensity over the 20 laser pulses from the data of FIGS. 7A or 7B because the data does not select for any particular statistical distribution. To obtain the most information about an object, the thresholds should be set so that sometimes they are exceeded, and sometimes they are not exceeded.

Proper adjustment of the threshold levels requires knowledge of the expected intensity of backscattered light. Therefore, in the present invention, data from previous laser pulses is used to adjust the threshold levels. If a vast majority of the threshold levels are exceeded for every pulse (i.e. like that in FIG. 7A), then the threshold levels should be increased; if very few of the threshold levels are exceeded for any pulse (i.e. like that in FIG. 7B), then the threshold levels should be reduced.

The threshold levels can be adjusted after a single laser pulse. For example, if the threshold levels are exceeded for an entire bit sequence, then the threshold levels should be increased. If none of the threshold levels are exceeded for an entire bit sequence, then the threshold levels should be reduced.

The best adjustment for the threshold levels also depends upon what objects in the scene 37 are of interest, and the background of the scene. For example, in military aerospace applications, high light intensity regions of a scene are typically of greatest interest because aircraft strongly scatter light. Areas of empty space surrounding an aircraft produce very low backscattered light intensity. For imaging the aircraft, the threshold levels should be set relatively high to provide resolution between the different parts of the aircraft (which all provide relatively high light intensity compared to the background). In this case, regions of empty space may not produce enough backscattered light to exceed even the lowest threshold level. Setting the threshold levels relatively high provides intensity resolution of high light intensity regions at the expense of the resolution of low light intensity regions A particularly useful method for adjusting the threshold levels to provide intensity resolution of high light intensity regions proceeds as follows:

1) Determine a mean light intensity value for the highest light intensity voxel (hereinafter referred to as the 'hottest voxel'). The mean light intensity value for the hottest voxel is a mean over a number of laser pulses. The mean light intensity of the hottest voxel is $N_s$. It is understood that measurement of $N_s$ requires multiple laser pulses.

2) Determine a variance constant V for the hottest voxel. The variance constant is $$V = \sqrt{N_s + \frac{(N_s)^2}{m}}$$

where m is a speckle parameter. m is typically in the range of 2–10. For more information on the speckle parameter m, reference can be made to the Goodman paper "Some effects of Target-Induced Scintillation on Optical Radar Performance".

3) For a system with 5 comparators, set the threshold levels to correspond to light intensities of $N_s+0.75V$, $N_s$, $N_s-0.5V$, $N_s-V$, and $0.125N_s$.

The above threshold level settings provide intensity resolution in the high intensity region of the scene. Therefore, the above settings are particularly good for imaging high intensity objects in a low intensity background (e.g. aircraft in a clear sky).

The best threshold level settings also depend on the optical properties of what is being imaged, at what intensities resolution is desired, and on environmental conditions. For example, if intensity resolution is desired in a low intensity region of the scene, the threshold levels are set at much lower values. For example, low threshold levels are useful for imaging a shadow of an underwater object where a surrounding region of bright scattering is not of interest.

Additionally, optimum threshold level settings can depend upon the characteristics of target recognition algorithms used to process the data provided by the present invention. For example, a target recognition algorithm may work best with a minimum intensity resolution or range of threshold levels.

In the above description, it is assumed that all the photodetectors in the array have the same threshold levels. Identical threshold levels for all the photodetectors avoids the complexity of multiple threshold controllers 26. However, a system with more than one set of threshold levels offers increased flexibility. The present invention includes embodiments where the different photodetectors in a single array have different threshold levels.

Figure 8:
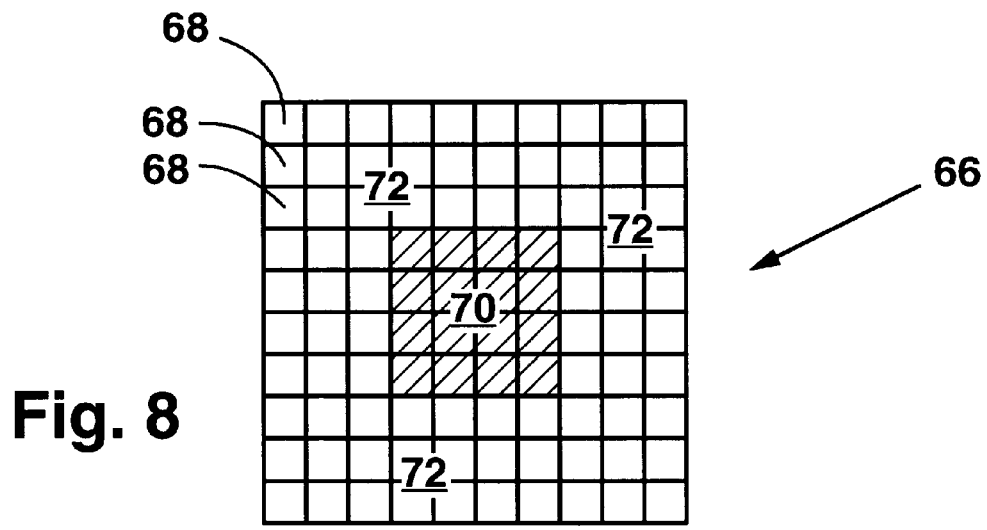
FIG. 8 shows a photodetector array where different photodetectors in the array have different threshold levels.

FIG. 8 shows a surface of a 10×10 photodetector array 66 having 100 photodetectors 68 with threshold levels set according to a preferred implementation of the present invention. Photodetectors in a central shaded portion 70 have threshold levels higher than threshold levels of photodetectors in surrounding region 72. In one embodiment, all the photodetectors in the central portion 70 have the same threshold levels, and all the surrounding photodetectors 72 have the same threshold levels. The advantage of having high threshold levels for central portion 70 is that a high light intensity object imaged onto the central portion has high intensity resolution without sacrificing the intensity resolution of a low intensity background imaged onto the surrounding region 72. The threshold levels for the central portion and surrounding region 72 are independently adjusted by two separate threshold controllers 26 (not shown).

Figure 9:
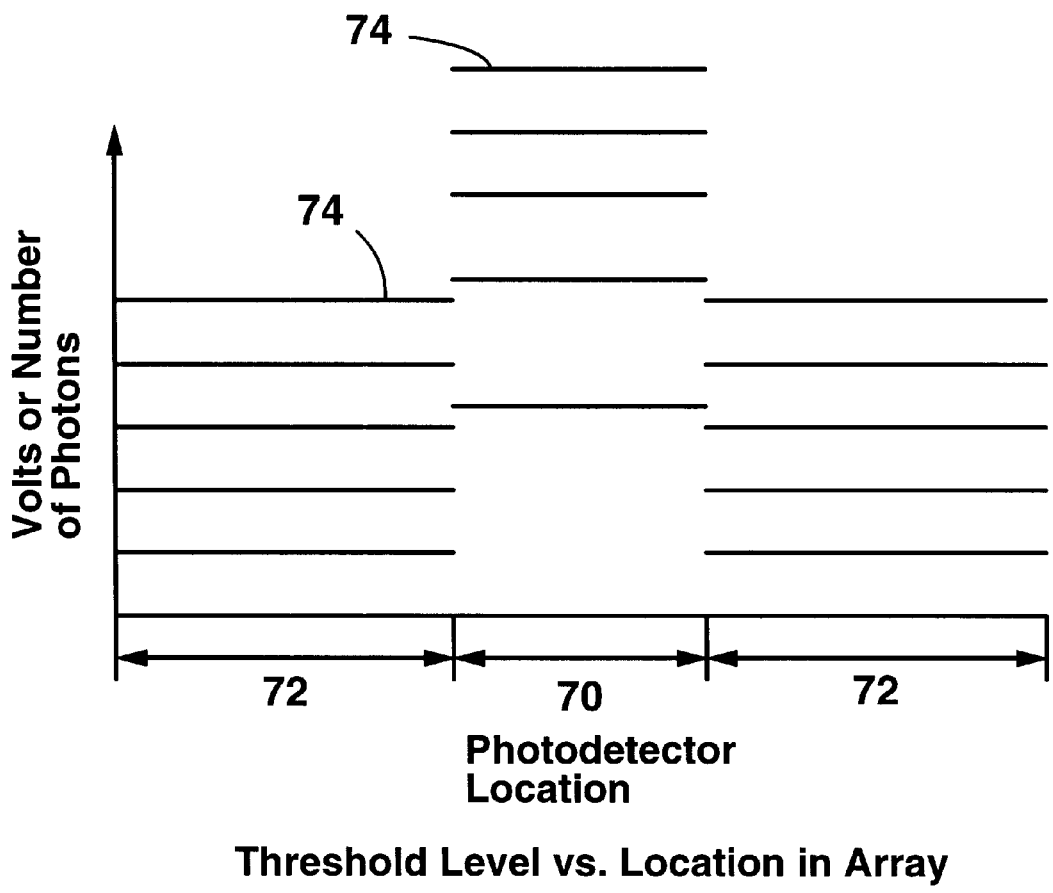
FIG. 9 shows a plot of threshold levels vs. location in the array of FIG. 8.

FIG. 9 graphically represents threshold levels 74 of photodetectors across a slice of the photodetector array 66. The threshold levels in FIG. 9 can be expressed in terms of number of photons, number of photoelectrons, voltage of photodetector output or any other equivalent measure.

Depending upon the characteristics of the photodetectors, it is understood that threshold levels may be directly converted between voltage applied on the comparator inputs, and a number of photons or number of photoelectrons at the photodetector.

The present invention provides high quality data which describes the scene illuminated by the laser pulse. In the preferred embodiments of the present invention, the data is processed by fitting data from multiple laser shots to a theoretically calculated statistical distribution (e.g. Poisson distribution or negative binomial distribution). The best fit statistical distribution is then used to determine the mean intensity of the voxel.

However, the data provided by the method and apparatus of the present invention can be used with a variety of imaging techniques. The present invention is not limited to the method of fitting the data to a best fit statistical distribution.

Data provided by the method and apparatus of the present invention can be used with a number of known standard target recognition algorithms and known imaging algorithms. An example of a target recognition algorithm usable with the method and apparatus of the present invention is described in the paper "Direct Detection Laser Radar Angle/Angle/Range—Imaging Target Identification Capabilities"; Dan Leslie, George Hart, & Douglas Youmans, *Proc. IRIS Active Systems*, 1997 vol. 1, pp 267–282. Another algorithm usable with the present invention is described in "Three Dimensional Template Correlations for Direct-Detection Laser Radar Target Recognition", by Douglas Youmans and George Hart, *Proc. IRIS Missile Defense Environments and Algorithms*, Monterey, Calif., January 1999. The method and apparatus of the present invention can be used in combination with any imaging or target recognition algorithm which operates on angle-angle-range data.

Figure 10:
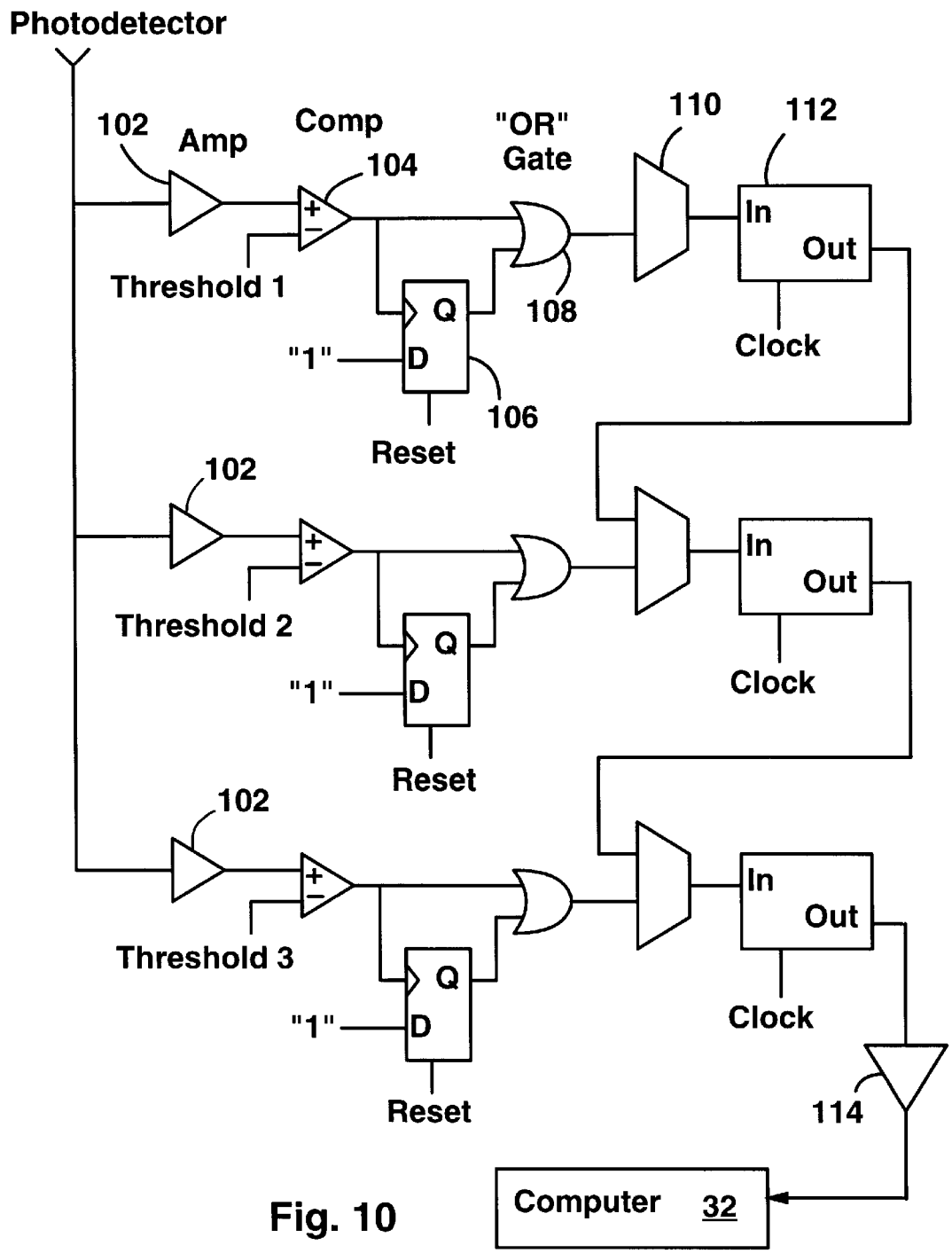
FIG. 10 shows a specific implementation of a circuit according to the present invention.

FIG. 10 shows a preferred implementation of the present invention. FIG. 10 shows a circuit for providing three thresholds for a single photodetector. The circuit has three amplifiers 102, each connected to a comparator 104. Three flip-flops 106 are also provided connected between the comparators and OR-gates 108. A multiplexer 110 is connected between the OR-gates and shift registers 112. A line driver 114 is used to send data from the shift registers to the computer 32. In operation, the multiplexers control when the shift registers 112 receive data and when the shift registers output data to the computer. The shift registers are cascaded so that they output data in a serial fashion to the computer 32.

The flip-flop 106 is used to capture received pulses which are much shorter than the shift register clock period. For example, if the shift registers sample at 1 Mhz, but the laser pulse duration is 1 ns, then the flip flops provide a necessary 'sample-and-hold' function.

The following table shows specific part numbers which can be used in the circuit of FIG. 10.

| Component | Part Number |
| --- | --- |
| Amplifier 102 | HPINA52063 |
| Comparator 104 | MC10E1651 |
| Flip-flop 106 | MC10EL31 |
| OR gate 108 | MC10EL04 |
| Shift Register 112 | MC10E142 (includes multiplexer) |
| Line Driver 114 | MC10E116 |

Figure 11:
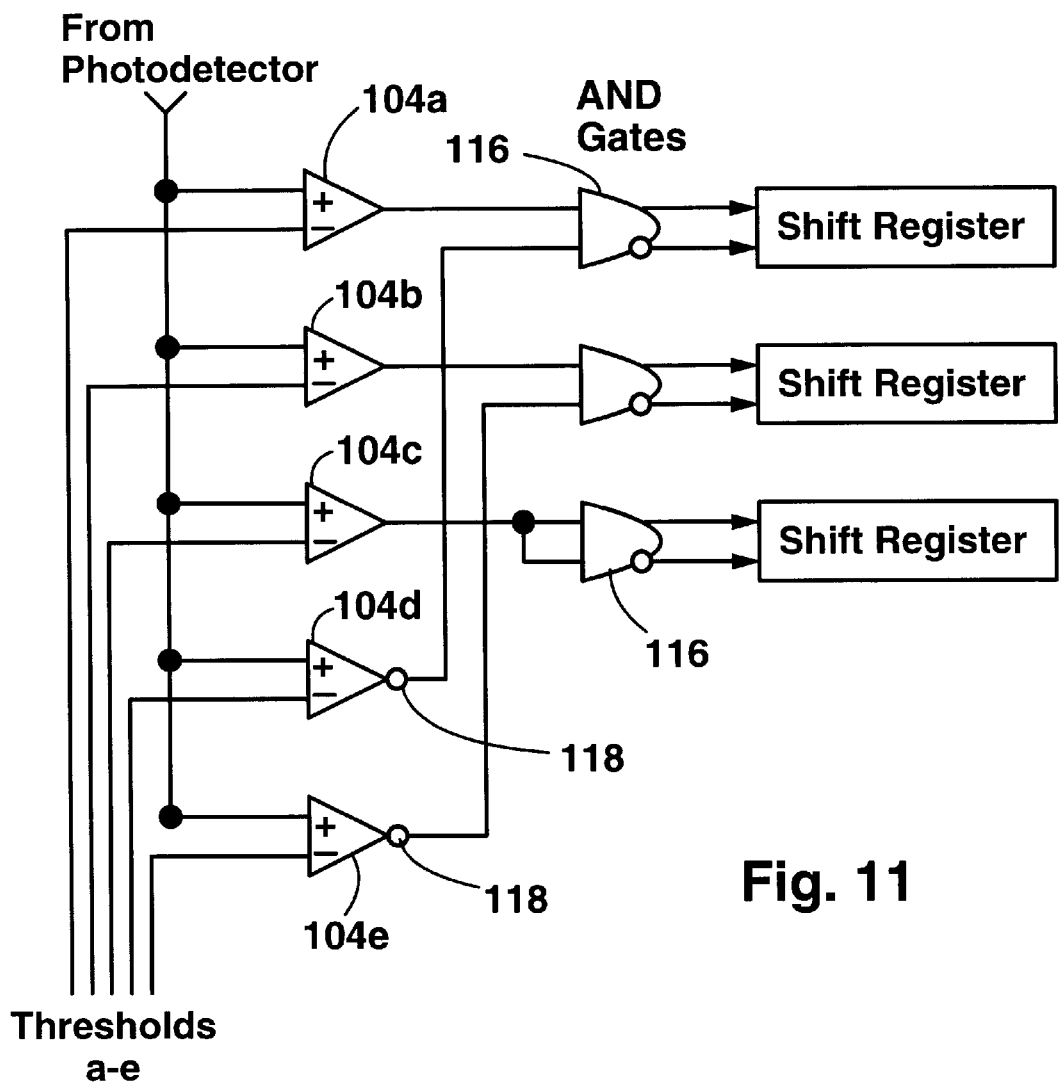
FIG. 11 shows a preferred embodiment of the present invention which provides gray code output and has a reduced number of shift registers.

FIG. 11 shows a particularly preferred circuit for processing signals from a single photodetector. The circuit provides a gray code output representing the photodetector signal. The lowest threshold comparators provide inverting outputs 118. The circuit has comparators 104a–104e connected to AND gates 116. The thresholds a-e must be set in a monotonically decreasing order (i.e. comparator 104a has the highest threshold; comparator 104e has the lowest threshold). The AND gates 116 are connected to three shift registers as shown. The AND gates have inverting and noninverting outputs. A particular advantage of the circuit of FIG. 11 is that the number of shift registers is reduced, thereby reducing power and cost. The circuit of FIG. 11 provides the same information as a circuit with 5 shift registers, but has fewer components. Similar circuits can be made with almost any number of comparators 104 by appropriately combining logic gates. For more information on such circuits employing gray code and a reduced number of components, reference can be made to *Handbook of Measurement Science*, Sydenham J. Wiley and Sons 1982, page 557.

Of course, the apparatus of the present invention can be made with discrete logic components as described, or can be integrated onto a monolithic chip. Also, it is generally known in the art that high speed electronics requires the use of transmission lines so that relative timing between different components is preserved.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for processing signals received from a photodetector in a laser radar device, comprising:
    a) a plurality of comparators, each comparator comprising:
        1) first comparative input for receiving an output from the photodetector,
        2) a second comparative input, and
        3) a comparator output;
    b) a plurality of shift registers connected to the comparator outputs;
    c) a threshold controller for providing a threshold level at each second comparative inputs, wherein the threshold controller can independently adjust the threshold level at each second comparative input.

2. The apparatus of claim 1 further comprising a low pass filter connected between the detector and the first comparative inputs.

3. The apparatus of claim 1 wherein the threshold controller comprises a digital to analog converter.

4. The apparatus of claim 1 wherein the shift registers are cascaded so that data output is provided from a single shift register.

5. The apparatus of claim 1 further comprising an amplifier connected between the detector and the first comparative inputs.

6. The apparatus of claim 1 wherein the comparators and shift registers are emitter-coupled logic components.

7. The apparatus of claim 1 further comprising logic components configured to provide gray code output.

8. The apparatus of claim 1 wherein the comparators and shift registers are high speed logic components.

9. A method for processing signals received from a photodetector, comprising the steps of:
   a) illuminating a scene comprising voxels with a light pulse having a duration less than 5 nanoseconds;
   b) detecting backscattered light from the scene using a photodetector, wherein the photodetector has a time response less than 5 nanoseconds;
   c) comparing an output from the photodetector with a plurality of threshold levels;
   d) generating a bit sequence for each threshold level, wherein each bit sequence indicates when the photodetector output exceeds the corresponding threshold level, whereby each bit sequence is associated with a threshold level.

10. The method of claim 9 further comprising the steps of:
    a) repeating steps (a), (b), (c), and (d);
    b) storing the bit sequences for all the laser pulses;
    c) grouping bits corresponding to a voxel such that for the voxel a distribution of a number of high bits versus threshold is provided;
    d) selecting a best fit statistical distribution for the voxel based on the distribution of the number of high bits versus threshold;
    e) calculating a mean intensity value for the voxel based on the best fit statistical distribution for the voxel, whereby a backscattered intensity value for the voxel is provided.

11. The method of claim 10, further comprising the steps of performing steps (c), (d), and (e) for each voxel in the scene.

12. The method of claim 10 Wherein the best fit statistical distribution is selected from a group of statistical distributions comprising Poisson distributions and negative binomial distributions.

13. The method of claim 9 further comprising the step of changing the threshold levels based on photodetector output from previous laser pulses.

14. An apparatus for processing signals received from a photodetector array in a laser radar device, comprising:
    a) a plurality of comparators associated with each photodetector in the array, each comparator comprising:
       1) first comparative input for receiving an output from the associated photodetector,
       2) a second comparative input, and
       3) a comparator output;
    b) a plurality of shift registers connected to the comparator outputs;
    c) a threshold controller for providing a threshold level at each second comparative inputs, wherein the threshold controller can independently adjust the threshold level at each second comparative input.

15. The apparatus of claim 14 further comprising a low pass filter connected between the detector and the first comparative inputs.

16. The apparatus of claim 14 wherein the threshold controller comprises a digital to analog converter.

17. The apparatus of claim 14 further comprising an amplifier connected between the detector and the first comparative inputs.

18. The apparatus of claim 14 wherein the threshold controller provides a different set of threshold levels associated with different photodetectors.

19. The apparatus of claim 14 wherein a central portion of the photodetector has higher threshold levels than surrounding photodetectors.

20. The apparatus of claim 14 wherein the comparators and shift registers are emitter-coupled logic components.

21. The apparatus of claim 14 wherein the comparators and shift registers are high speed logic components.

22. A method for laser radar imaging of a scene comprising voxels, comprising the steps of:
    a) illuminating the scene with a light pulse having a duration less than 5 nanoseconds;
    b) detecting backscattered light from the scene using a photodetector array, wherein each photodetector in the array has a time response less than 5 nanoseconds;
    c) comparing an output from each photodetector with a plurality of threshold levels;
    d) for each photodetector, generating a bit sequence for each threshold level, wherein each bit sequence indicates when the photodetector output exceeds the corresponding threshold level, whereby each bit sequence is associated with a threshold level.

23. The method of claim 22 further comprising the steps of:
    a) repeating steps (a), (b), (c), and (d);
    b) storing the bit sequences for all the laser pulses;
    c) grouping bits corresponding to a voxel such that for the voxel a distribution of a number of high bits versus threshold is provided;
    d) selecting a best fit statistical distribution for the voxel based on the distribution of the number of high bits versus threshold;
    e) calculating a mean intensity value for the voxel based on the best fit statistical distribution for the voxel, whereby a backscattered intensity value for the voxel is provided.

24. The method of claim 23 further comprising the steps of performing steps (c), (d), and (e) for each voxel in the scene.

25. The method of claim 23 wherein the best fit statistical distribution is selected from a group of statistical distributions comprising Poisson distributions and negative binomial distributions.

26. The method of claim 22 further comprising the step of changing the threshold levels based on photodetector output from previous laser pulses.

27. The method of claim 22 wherein the threshold levels are the same for each photodetector in the photodetector array.

28. The method of claim 22 wherein the threshold levels are not the same for each photodetector in the photodetector array.

* * * * *